United States Patent
Conrad et al.

(10) Patent No.: US 6,368,082 B1
(45) Date of Patent: Apr. 9, 2002

(54) VACUUM PUMP WITH ROTOR SUPPORTING GAS BEARINGS

(75) Inventors: Armin Conrad, Herborn; Wolfgang Eberl, Solms, both of (DE)

(73) Assignee: Pfeiffer Vacuum GmbH, Asslar (DE)

( * ) Notice: Subject to any disclaimer, the term of this patent is extended or adjusted under 35 U.S.C. 154(b) by 0 days.

(21) Appl. No.: 09/543,300

(22) Filed: Apr. 5, 2000

(30) Foreign Application Priority Data

Apr. 9, 1999 (DE) .......................................... 199 15 983

(51) Int. Cl.[7] .................................................. F04B 17/00
(52) U.S. Cl. ............... 417/423.4; 417/363; 417/423.12; 417/423.14
(58) Field of Search ................................ 417/201, 242, 417/363, 423.4, 423.12, 423.14

(56) References Cited

U.S. PATENT DOCUMENTS

| | | | | |
|---|---|---|---|---|
| 3,832,084 A | * | 8/1974 | Maurice | 415/90 |
| 3,969,042 A | * | 7/1976 | Bachler | 417/354 |
| 4,822,182 A | * | 4/1989 | Matsushita et al. | 384/107 |
| 4,919,599 A | * | 4/1990 | Reich et al. | 417/423.4 |
| 5,501,583 A | * | 3/1996 | Nagaoka et al. | 417/423.4 |
| 5,662,456 A | * | 9/1997 | Englander | 415/90 |

FOREIGN PATENT DOCUMENTS

| | | | |
|---|---|---|---|
| DE | 2359456 | 6/1975 | F04D/19/04 |
| DE | 2255618 | 5/1983 | F04D/19/04 |
| DE | 3537822 | 4/1987 | F04D/29/66 |
| DE | 2549700 | 11/1996 | F04D/19/04 |

* cited by examiner

Primary Examiner—Charles G. Freay
Assistant Examiner—Timothy P. Solak
(74) Attorney, Agent, or Firm—Sidley Austin Brown & Wood, LLP

(57) ABSTRACT

A vacuum pump including a housing having a suction flange and an outlet opening, a plurality of stationary and rotatable pump-active elements arranged in the housing, a rotor shaft for supporting the rotatable elements, a system of gas bearings for supporting the rotor shaft, with the gas bearings being substantially formed of stator elements with gas delivery conduits and gas outlets, and a system of resilient elements for connecting the stator elements with the bearing housing.

7 Claims, 2 Drawing Sheets

VACUUM PUMP WITH ROTOR SUPPORTING GAS BEARINGS

BACKGROUND OF THE INVENTION

1. Field of the Invention

The present invention relates to vacuum pump including a housing having a suction flange and an outlet opening, a plurality of stationary and rotatable pump-active elements arranged in the housing, a rotor shaft for supporting the rotatable elements, a system of gas bearings for supporting the rotor shaft, with the gas bearings being substantially formed of stator elements with gas delivery conduits and gas outlets.

2. Description of the Prior Act

Among the rotary vacuum pumps, gas friction pumps are characterized in that they are superbly suitable for use in high and ultra-high vacuum technology. Because in these pumps, the compression ratio increases exponentially with molecular weight, they can be effectively used in the production of hydrocarbon-free vacuum. The most known and most widely used pumps of this type are turbomolecular pumps and molecular pumps such as Holweck pumps or combination of both. All of the below listed characteristics and constructional features which belong to the state of the art, the drawbacks and their elimination according to the present invention apply to those pumps and, in particular, to gas friction pumps.

Important for efficiency of such pumps is a high rotational speed of the pump rotor that places a very high demand on the rotor support. Initially in the gas friction pumps, the support was provided by ball bearings. With the development of high quality magnetic materials, it became possible to so reduce the dimensions of the magnetic bearings and expenses associated with the use of magnetic bearing to an extent that their use in high-speed vacuum pumps became justified from both technical and economical points of view. However, attempts to equip the gas friction pump with gas bearings were not undertaken for reasons mentioned below.

When the gas friction pumps are used in the production of hydrocarbon-free vacuum, the use of oil-or grease-lubricated ball bearings negate their advantages. During the operation of the pump, the hydrocarbon particles, which escape from the lubricant, are kept away from the high-vacuum side. However, during stoppage, these particle can diffuse toward the high-vacuum side. Even very expensive measures, which are undertaken to prevent this effect do not make those pumps absolutely hydrocarbon-free, which limits their application. Dry roll or slide bearings, because of their high friction losses and high wear, are not suitable for the required long-lasting operation.

Different types of magnetic bearings are available for use in vacuum technology. This is made possible by their dry and wear-free operation. However, the control electronics for pumps, in which the magnetic bearings are used, should met very high requirements in order to obtain a reliable and disturbance-free operation. In addition, their use in vicinity of strong magnetic fields and in radiation-intensive environment presents a number of problems. Emergency measures undertaken in case of disturbances mean additional expenses.

German Publications Nos. 2,255,618; 2,359,456, and 3,891,280 disclose different embodiments of turbomolecular pumps with gas bearings. The gas bearings permit to at least partially eliminate the above-mentioned drawbacks of mechanical and magnetic bearings. However, their practical application is associated with many difficulties. The reason of their practical inapplicability are: a too large gas flow rate, dead spaces between the rotor and stator discs, large length of the pumps, small stability, non-adequate precision along the length during assembly, etc.

Further developments of aerodynamic bearings lead to systems in which a part of the above-listed drawbacks can be eliminated (please see German Pat. No. 4,436,156). The use of laser technology permitted to drill in the bearing surfaces a large number of micro-bores. The bores substitute relatively large nozzles of conventional gas bearings. This permitted to increase the support stability, to provide a consistent flow rate, reduce the dead spaces, and to increase the rigidity due to a narrower clearance. The latter feature, the clearance reduction, can be effected only to a very small extent, in particular, because of precision requirements to the mounting of rotor and stator parts. Because, e.g., during use of two, spaced from each other radial bearings, even a smallest deviation of centering in one of the bearings results in an unacceptable change of the outermost clearance in another bearing, and it is extremely difficult, if not impossible, to undertake the necessary high-precision adjustments.

Accordingly, the object of the present invention is to provide a vacuum pump with gas support which would guarantee, taken into account the requirements of vacuum technology, a reliable and disturbance-free operation with minimum of expenses.

Another object of the present invention is to provide a vacuum pump with gas support which would insure, due to the use of new technology, obtaining small clearances upon the use of gas bearings, in particular during assembly of the pump.

A further object of the present invention is to provide a vacuum pump with gas support in which the advantages resulting from narrower clearances are obtained with reduction in total costs and due to an appropriate dimensioning of the gas bearings.

SUMMARY OF THE INVENTION

These and other objects of the present invention, which will become apparent hereinafter are achieved by providing a vacuum pump including a housing having a suction flange and a outlet opening, a plurality of stationary and rotatable pump-active elements arranged in the housing, a rotor shaft for supporting the rotatable elements, a system of gas bearings for supporting the rotor shaft, with the gas bearings being substantially formed of stator elements with gas delivery conduits and gas outlets and a system of resilient elements for connecting the stator elements with the bearing housing.

The present invention shows a path to practical use of advantages, which result from further improvement of gas bearings and their use in vacuum pumps and which up to the present could not implemented. The resilient support of the stator elements or parts of gas bearings permitted a precise mounting of the gas bearings because the elasticity permitted to compensate unavoidable tilt and to achieve an exact alignment of the bearings parts. Simultaneous use of the elastic parts as sealing elements between the high-pressure and low-pressure chambers of the bearing housing or the forevacuum chambers is also an advantage.

The rigidity of the resilient components should be smaller than the rigidity of the entire gas bearing system to insure an adequate elasticity of the bearing parts to provide for their adaptation. They, however, should have dimensions such that they insure that the requirements resulting from small clearances between the pump-active stator and rotor elements are met in order to prevent pump acceleration.

The reduction of clearances in gas bearing systems permitted to achieve a number of advantages, e.g., a higher rigidity, smaller gas consumption, and smaller pressure difference for obtaining the supporting gas cushion. The later advantage permitted to use a pressure difference of less than 1 bar. In this case, a natural difference of 1 bar between the atmosphere and the vacuum can be used to provide the necessary support. This permitted to eliminate the units for producing the pressure gas which, in turn, permitted to reduce the expenses and, the space requirements which increased the costs of gas bearings and the costs of insuring their operational reliability.

In order to maintain an adequate pressure difference, there is provided a vacuum pump unit which is connected with the gas outlets of the stator elements by respective gas discharge conduits. As a vacuum pump unit, an available forevacuum pump can be used.

When a gas friction pump includes a stage communicating with atmosphere, which eliminates a separate forevacuum pump unit, there can be provided a plurality of gas discharge conduits connecting the outlet openings of the stator elements to the stage, which communicates with atmosphere, and supplied, at a connection point with the state, with a pressure between a forevacuum pressure and an atmospheric pressure, preferably, with the forevacumm pressure.

Alternatively, the gas supply can be effected directly from atmosphere through the gas conduits or from a compressor connected to the gas bearings by gas delivery conduits. As a compressor, one used with conventional gas bearings can be used.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
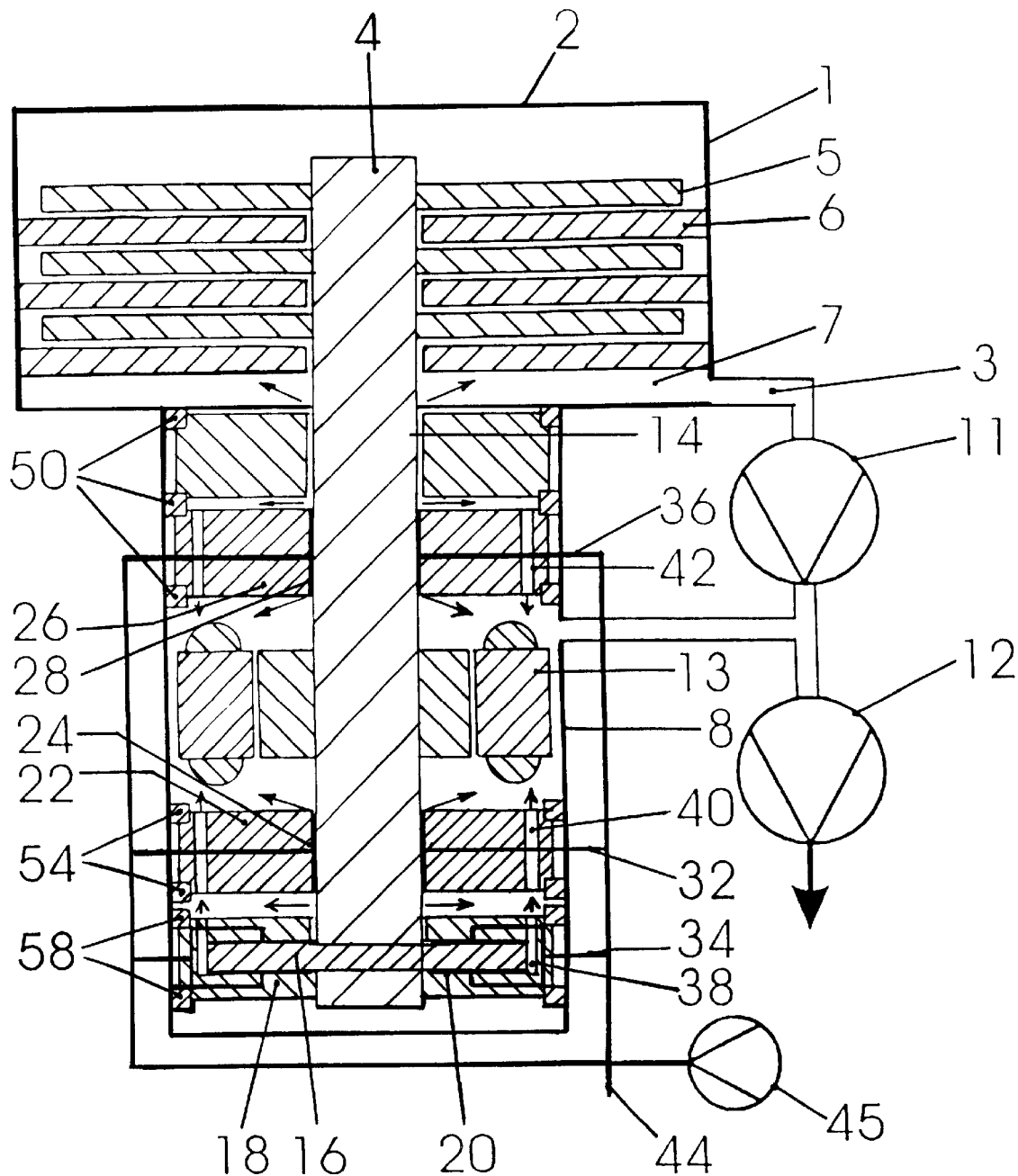
FIG. 1 a schematic view of an arrangement according to the present invention of a turbomolecular pump with a gas bearing sytstem.

A turbomolecular pump shown in FIG. 1 includes a pump housing 1 with a suction flange 2 and an outlet opening 3. Stator discs 6, which serve as pump-active elements, are stationary secured in the pump housing 1. The other pump-active elements, rotor discs 5, are fixedly mounted on a rotor shaft 4. The rotor shaft 4 is rotated by a drive unit 13. The rotor shaft 4 is supported by a system of gas bearings which are formed of essentially stator elements 18, with a thrust plate 16, 22, and 26, gas delivery means 32, 34, and 36, and gas outlets 20, 24, and 28. The stator elements 18, 22, and 26 are connected with a bearing housing 8, according to the invention, by a system of resilient elements 50, 54 and 58. The resilient elements 50, 54, 58, simultaneously serve for sealing high-pressure and low-pressure chambers of the bearing housing 8 or a forevacuum chamber 7 which is also sealed with a sealing 14.

For functioning of the arrangement, it is important that the rigidity of the resilients elements 50, 54, and 58 be smaller than the rigidity of the system of gas bearings. However, this rigidity should not exceed a predetermined threshold which is determined by a necessary clearance between the rotor and stator elements and by a force applied to the rotor.

The gas, which is discharged through gas outlets 20, 24, 28, is delivered to a vacuum pump unit 11, 12 through a system of gas conduits 3 8, 40, 42. The vacuum pump unit 11, 12 can simultaneously serve as a forevacuum pump for a gas friction pump and, in this case, is connected with the forevacuum chamber 7.

Figure 2:
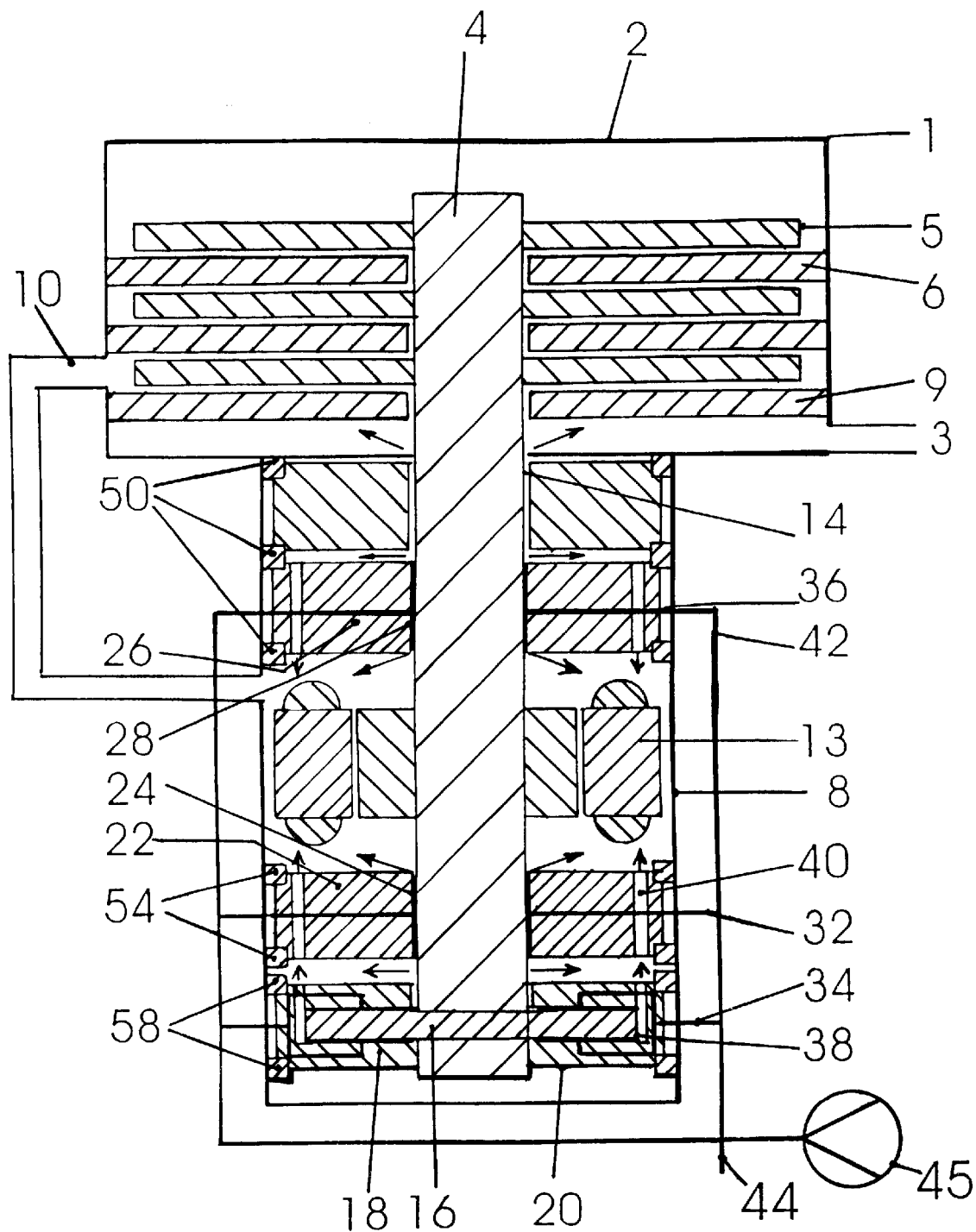
FIG. 2 another embodiment of an arrangement according to the present invention of a turbomolecular pump with a gas bearing system.

As shown in FIG. 2, the gas friction pump can be provided with an outlet stage 9 connectable either to a higher pressure or to atmosphere. The gas discharge conduits 38, 40, and 42 can then, at a point 10 of this stage, be supplied with pressure between a forevacuum pressure and an atmospheric pressure.

The gas delivery conduits 32, 34, 36 are connected either to atmospheric pressure at 44 or to a compressor unit 45.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A vacuum pump, comprising a housing having a suction flange and an outlet opening; a plurality of stationary and rotatable pump-active elements arranged in the housing; a rotor shaft for supporting the rotatable elements, a system of gas bearings for supporting the rotor shaft, the gas bearings being substantially formed of stator elements with gas delivery conduits and gas outlets; a system of resilient elements for connecting the stator elements with the bearing housing; a vacuum pump unit, which serves as a forevacuum pump of a gas friction pump; and a plurality of gas discharge conduits connecting the gas outlets of the stator elements with the vacuum pump unit.

2. A vacuum pump, comprising a housing having a suction flange and an outlet opening; a plurality of stationary and rotatable pump-active elements arranged in the housing; a rotor shaft for supporting the rotatable elements, a system of gas bearings for supporting the rotor shaft, the gas bearings being substantially formed of stator elements with gas delivery conduits and gas outlets; a system of resilient elements for connecting the stator elements with the bearing housing; a stage communicating with atmosphere; and a plurality of gas discharge conduits connecting the outlet openings of the stator elements to the stage and supplied, at a connection point of the gas discharge conduits with the stage, with a pressure between a forevacuum pressure and an atmospheric pressure.

3. A vacuum pump as set forth in claim 2, wherein the gas discharge conduits are supplied with the forevacuum pressure.

4. A vacuum pump, comprising a housing having a suction flange and an outlet opening; a plurality of stationary and rotatable pump-active elements arranged in the housing; a rotor shaft for supporting the rotatable elements, a system of gas bearings for supporting the rotor shaft, the gas bearings being substantially formed of stator elements with gas delivery conduits and gas outlets; and a system of resilient elements for connecting the stator elements with the bearing housing, wherein the resilient elements simultaneously serve for providing a sealing between high-pressure and low-pressure chambers of one of the bearing housing and a forevacuum chamber.

5. A vacuum pump as set forth in claim 4, wherein the system of the resilient elements has a rigidity smaller than a rigidity of the system of the gas bearings.

6. A vacuum pump as set forth in claim 4, further comprising a vacuum pump unit; and a plurality of gas discharge conduits connecting the gas outlets of the stator elements with the vacuum pump unit.

7. A vacuum pump as set forth in claim 4, comprising a conduit for connecting the gas delivery conduits with atmosphere.

* * * * *